United States Patent [19]

Kimata

[11] 3,922,882
[45] Dec. 2, 1975

[54] POWER TRANSMISSION ASSEMBLY FOR USE IN MOTOR VEHICLES

[75] Inventor: Isao Kimata, Shizuoka, Japan

[73] Assignee: Yazaki Corporation, Tokyo, Japan

[22] Filed: Oct. 2, 1973

[21] Appl. No.: 402,764

[52] U.S. Cl.............................. 64/2 R; 64/3; 74/501
[51] Int. Cl.² ......................................... F16C 1/02
[58] Field of Search ...................... 64/2, 3, 4, 1, 1 S; 74/501

[56] References Cited
UNITED STATES PATENTS

| | | | |
|---|---|---|---|
| 2,012,842 | 8/1935 | Whitted | 64/2 R |
| 2,036,528 | 4/1936 | Kesling | 64/2 R |
| 2,087,373 | 7/1937 | Dodge | 64/3 |
| 3,224,260 | 12/1965 | Lankford | 64/2 R |
| 3,481,156 | 12/1969 | Csipkes | 64/2 |
| 3,791,898 | 2/1974 | Remi | 64/2 R |

Primary Examiner—Samuel Scott
Assistant Examiner—Randall Heald

[57] ABSTRACT

A tubing for holding therein a flexible shaft used in motor vehicles, characterized by its inner face provided with a plurality of portions for residence of a lubricant. The portions can easily be provided by making the inner face of the tubing polygonal in cross section. With such structure of tubing, the leakage-out of the lubricant can be effectively avoided.

2 Claims, 4 Drawing Figures

POWER TRANSMISSION ASSEMBLY FOR USE IN MOTOR VEHICLES

This invention relates to a tubing for holding therein a flexible shaft, and more particularly to a tubing for holding therein a flexible shaft linking a wheel section to a speedometer in a motor vehicle. Heretofore, as is known in the art, tubings for holding therein a flexible shaft are made of a helically wound metallic wire. Recently, a synthetic resin such as polyethylene or nylon which has a small frictional resistance has come to be used for manufacturing the tubings of this kind.

A primary object of this invention is to provide a tubing for holding therein a flexible shaft used in a motor vehicle which is capable of maintaining, for a long period of time, a lubricant in the space between the flexible shaft and the inner surface of the tubing without causing the lubricant to leak out of the tubing under rotation of the flexible shaft.

The foregoing and other objects, features and advantages of the present invention will be apparent to those skilled in the art from the following detailed description taken in connection with the accompanying drawing in which.

Figure 1:
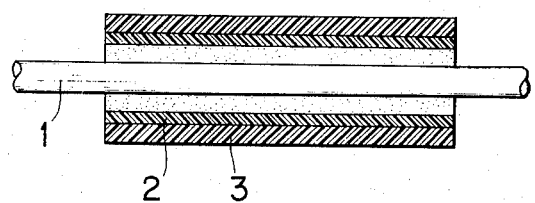
FIG. 1 shows a partial longitudinal section of a conventional tubing for holding a flexible shaft used in motor vehicles.
Figure 2:
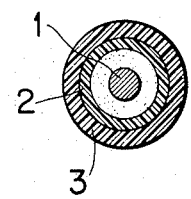
FIG. 2 is a transverse section of the tubing shown in FIG. 1.

Referring to FIGS. 1 and 2, there is shown a conventional tubing for holding a flexible shaft used in motor vehicles in which a flexible shaft 1 is inserted into a tubing 2 which has a circular cross section and made of a synthetic resin such as polyethylene or nylon. The space between the shaft 1 and tubing 2 is filled with a lubricant such as grease. Further, the tubing is covered with a protective coat 3. However, this has a defect in which the lubricant leaks out of the tubing. As shown in FIGS. 1 and 2, the tubing 2 has a circular cross sectional and smooth inner surface. Therefore, the lubricant such as grease filling the space between the shaft 1 and the inner surface of the tubing is caused to leak out of the tubing at its ends by the rotation of the flexible shaft 1.

Figure 3:
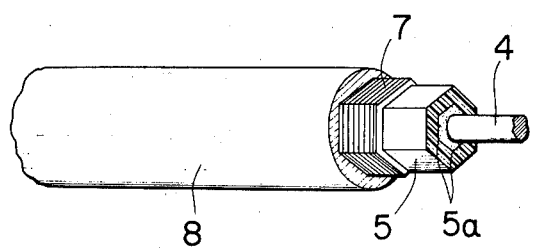
FIG. 3 shows a perspective view of a tubing for holding a flexible shaft embodying this invention, with a protective coat partly removed to show the internal structure of the tubing.
Figure 4:
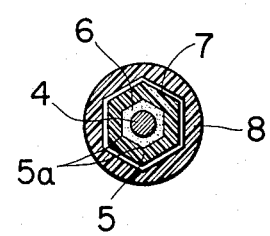
FIG. 4 is a transverse section of the tubing shown in FIG. 3.

Referring now to FIGS. 3 and 4 which show an embodiment of this invention, there is shown a tubing for holding therein a flexible shaft used in motor vehicles which comprises a tubing 5 made of a synthetic resin such as polyethylene or nylon and has its inner surface which is formed polygonal in cross section to provide a plurality of corner portions 5a for residence of the lubricant 6. When a flexible shaft 4 is inserted into the tubing 5, the space between the shaft 4 and inner surface of the tubing 5 is filled with the lubricant 6 so that the shaft is entirely supported with only the aid of the lubricant. Numeral 7 indicates a plurality of steel wires helically wound around the tubing 5 to prevent the deformation of the tubing 5 when the tubing 5 is disposed in a position with high temperature or the tubing 5 is bent with a large curvature. Instead of the steel wires, there may be employed a steel braid. The steel wire 7 may be omitted if the tubing 5 is used in a position with lower temperature or bent with a small curvature. Numeral 8 indicates a protective coat of the tubing 5 and is made by extrusion of a plastic material such as polyvinyl chloride, polyethylene or polypropylene.

With the structure stated above, the lubricant does not move as it does in the tubing 2 of FIGS. 1 and 2 under the rotation of the flexible shaft 1, but is held resident at the corner portions 5a and kept in such state that the flexible shaft 4-the tubing 5 interface is always given sufficient lubrication. Therefore, the flexible shaft 4 always rotates smoothly and the accident such as the break-down of the flexible shaft 4 caused by the friction can be avoided. The movement of the lubricant to the end portions of the tubing 5 is prevented by the structure stated above and therefore, the leakage of the lubricant is completely avoided.

What is claimed is:

1. A power transmission assembly for use in motor vehicles, comprising a tubular member having an inner face with a hexagonal cross section to form six corner sections to contain a lubricant, and a flexible shaft of circular cross section which is entirely supported with only the aid of the lubricant in coaxial alignment with the tubular member.

2. A power transmission assembly according to claim 1, wherein the tubular member is provided on its outer periphery with a plurality of steel wires helically wound thereon or a steel braid.

* * * * *